United States Patent
Ochiai et al.

(10) Patent No.: US 6,422,331 B1
(45) Date of Patent: Jul. 23, 2002

(54) HYBRID VEHICLE

(75) Inventors: Shinobu Ochiai; Shinji Yoshikawa, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/648,749

(22) Filed: Aug. 28, 2000

(30) Foreign Application Priority Data

Aug. 30, 1999 (JP) ............................................. 11-244126

(51) Int. Cl.⁷ ............................... B60K 6/02; G06F 7/04
(52) U.S. Cl. ..................... 180/65.2; 701/22; 318/434; 318/471
(58) Field of Search ............................... 180/65.2, 65.3, 180/65.4, 65.1, 65.8; 701/22; 318/430, 432, 433, 434, 471

(56) References Cited

U.S. PATENT DOCUMENTS

| | | | |
|---|---|---|---|
| 5,461,531 A | * 10/1995 | Tuchiya et al. | ............. 180/65.2 |
| 6,131,057 A | * 10/2000 | Tamaki et al. | .............. 180/65.2 |
| 6,140,780 A | * 10/2000 | Oshima et al. | ............. 180/65.2 |
| 6,186,254 B1 | * 2/2001 | Mufford et al. | ............. 180/65.2 |
| 6,204,769 B1 | * 3/2001 | Arai et al. | .................. 180/65.2 |
| 6,233,508 B1 | * 5/2001 | Deguchi et al. | ........... 180/65.2 |
| 6,276,472 B1 | * 8/2001 | Takashima et al. | ........ 180/65.2 |

FOREIGN PATENT DOCUMENTS

JP        07123509        5/1995

* cited by examiner

*Primary Examiner*—Lanna Mai
*Assistant Examiner*—Jeffrey Restifo
(74) *Attorney, Agent, or Firm*—Arent Fox Kintner Plotkin & Kahn, PLLC

(57) ABSTRACT

A hybrid vehicle includes a power drive unit which is quickly stopped without increasing the load on a motor control apparatus should a short develop inside the power drive unit. The power drive unit contains a self-protection circuit, which shuts off the control signals to the switching elements for a given interval, when the temperature of the switching elements reaches a certain temperature value or when the current flowing in the power drive unit reaches a certain current value. The self-protection circuit outputs a shorting signal to indicate the state of the self-protection caused by the shut off. The motor control apparatus detects shorting signals from the self-protection circuit, and responds by stopping the output of control signals, when the self-protection state is reported, is greater than a predetermined number of times or the cumulative time in the self-protection state reaches a predetermined time.

5 Claims, 9 Drawing Sheets

HYBRID VEHICLE

BACKGROUND OF THE INVENTION

1. Field of the Invention

The present invention relates to a hybrid vehicle, and relates in particular to a hybrid vehicle that provides protective actions to the power drive unit, which drives the motor.

This application is based on Japanese Patent Application, Unpublished, No. Hei 11-244126, the contents of which are incorporated herein by reference.

2. Description of the Related Art

Conventionally, hybrid vehicles having a motor driven by electrical energy in addition to an engine driven by combustion energy to provide driving force for driving a vehicle are known. One type of such hybrid vehicles is a parallel hybrid vehicle in which the motor is used to assist the operation of the engine as auxiliary driving force. The parallel hybrid vehicle is designed to satisfy driver demands for performance by using the motor to assist the output power of the engine during the acceleration stage, for example, and during the deceleration stage, the motor is used as deceleration regenerator to charge the battery to maintain remaining battery charge (as disclosed in a Japanese Patent Application, First Publication, No. Hei 7-123509, for example).

Hybrid vehicle is provided with a power drive unit for the purpose of motor operation or power regeneration. The power drive unit has a number of switching elements, which are used for controlling the current flow through the motor to drive the motor or regenerate power. A motor control apparatus is provided in such a hybrid vehicle to control the switching elements according to control signals generated by the control apparatus.

Here, if a short circuit develops inside the power drive unit, it is necessary to quickly stop the operation of the switching elements controlling the current in order to prevent damage to the switching elements. Stopping of the current control action using the switching elements may be performed by the motor control apparatus; however, it is necessary to provide a quick remedial action to counter the short circuit problem so that the processing load on the motor control apparatus is increased. For this reason, there is a potential danger that important periodic requirements of the motor, such as torque control for the motor may not be provided by the motor control apparatus in a timely manner.

Furthermore, erroneous determination can be made in checking such short circuit problems so that it is necessary to provide how to process such a situation in the overall control methodology.

SUMMARY OF THE INVENTION

It is, therefore, an object of the present invention to provide a hybrid vehicle that, should a short is developed in the power drive unit, can stop control of current to supply power to the switching elements without increasing the processing load on the motor control apparatus.

Another object of the present invention is to provide a hybrid vehicle that can respond appropriately when a detected short in the power drive unit is an erroneous detection.

To achieve the objects, the present invention provides a hybrid vehicle comprising: an engine (engine 1 in the embodiment); a motor (motor 2) which operates with electrical energy; a power drive unit (power drive unit 7) having switching elements to control the flow of current to operate the motor; and a control apparatus (motor control apparatus 5) for generating control signals to operate the switching elements; wherein the power drive unit is further provided with a self-protection circuit (self-protection circuit 75) to interrupt the supply of current to the switching elements temporarily for a specified interval when a temperature of a switching element is higher than a specific temperature value or the value of current flowing through the power drive unit is greater than a specific current value, and to output a signal indicating that the power drive unit is in a self-protection state caused by a current flow interruption; and the control apparatus receives the signal from the self-protection circuit indicating that the power drive unit is in the self-protection state, and if a number of times the signal is received is greater than a predetermined number or if the cumulative time in the self-protection state is greater than a predetermined time, the control apparatus prohibits the control signal from operating the switching elements (steps S21–S29, step S61, step S62).

According to the above structure of the hybrid vehicle, the self-protection circuit included in the power drive unit decides that a shorting state exists based on a condition that either a temperature of the switching elements is higher than a specified temperature value or the value of the current flowing through the power drive unit is greater than a specified current value. When this condition is satisfied, the self-protection circuit temporarily interrupts the control signals to the switching elements for a specified interval. Therefore, when a short is developed inside the power drive unit, current control action of the switching elements can be stopped for a certain period of time.

Accordingly, damage to the switching elements caused by the short can be prevented. Also, because the current control can be provided without going through the control apparatus, rapid remedial response to the short can be provided in a short time.

Also, the self-protection circuit outputs a signal indicating that the power drive unit is in a self-protection state caused by a control signal interruption. Because this interruption of control signals continues for a given duration, if an actual short has been developed, the self-protection state and the non-self-protection state are reported alternately to the control apparatus. Therefore, the control apparatus determines whether the shorting state in the power drive unit is real, according to a number of times the signal is received reaches a predetermined number or the cumulative time in the self-protection state is greater than a predetermined time. When this condition is satisfied, the control apparatus prohibits control signals to the power drive unit.

Accordingly, the control apparatus can distinguish false reporting of shorting from the actual reporting of shorting provided by the self-protection circuit. Therefore, the control apparatus stops the switching elements to perform current control (motor control) completely only when there is an actual short.

In the second aspect of the present invention, the vehicle is further provided with a battery (12 V battery 9) to supply driving power to at least the self-protection circuit and the control apparatus; and the control apparatus stops receiving the signal sent from the self-protection circuit (step S11) when a detected voltage of the battery is lower than a specified voltage value (the voltage-down threshold V1).

The second aspect is important, because when the drive voltage supplied to the self-protection circuit and the control apparatus is low, there is a danger that the operation of the self-protection circuit and the control apparatus becomes unstable such that appropriate response to the shorting state may not be carried out. However, by providing the structure described above, the control apparatus is designed not to detect shorting signals sent from the self-protection circuit so that erroneous detection of shorting state caused by instances of unstable operation can be prevented.

In the third aspect of the invention, the control apparatus prohibits the control signals when the control apparatus sequentially detects, at a predetermined duration (specified duration T4), a condition that either a number of times the signal is received is greater than a predetermined number or the cumulative time in the self-protection state is greater than a predetermined time (steps S31–S36).

Accordingly, it is possible to prevent erroneous confirmation of the shorting state caused by a short break of power supplied to the power drive unit.

In the fourth aspect of the present invention, the control apparatus decides that the battery is in a voltage-low state when a state, in which the detected voltage of the battery is lower than the specified voltage value, continues for a specified voltage-low determination interval (voltage-low determination interval A2), and responds by lowering an existing value of the motor torque to zero or by prohibiting the control signals depending on the operating conditions of the motor (steps S65–S68).

Accordingly, in the voltage-low state of the battery in which there is a fault in the battery power supply system, it is possible to stop control actions of the motor safely before the supply of driving power becomes completely exhausted.

Also, according to the fifth aspect of the present invention, the control apparatus determines that the battery that had been in a voltage-low state is now in a voltage-recovery state when a state, in which the detected voltage of the battery is higher than a specified threshold value (voltage-up threshold Vh), continues for a specified voltage-recovery determination interval (voltage-recovery determination interval B2), and responds by outputting a control signal to operate the motor so as to adjust an existing value of the motor torque to match a demanded value of the motor torque (steps S69–S72).

Accordingly, although the determination had been made that the battery is in the voltage-low state, if in reality, there is no fault in the battery power supply system and the battery voltage is restored, the normal operation of the vehicle can be resumed.

DETAILED DESCRIPTION OF THE PREFERRED EMBODIMENTS

Preferred embodiments of the hybrid vehicle will be explained with reference to the drawings.

Figure 1:
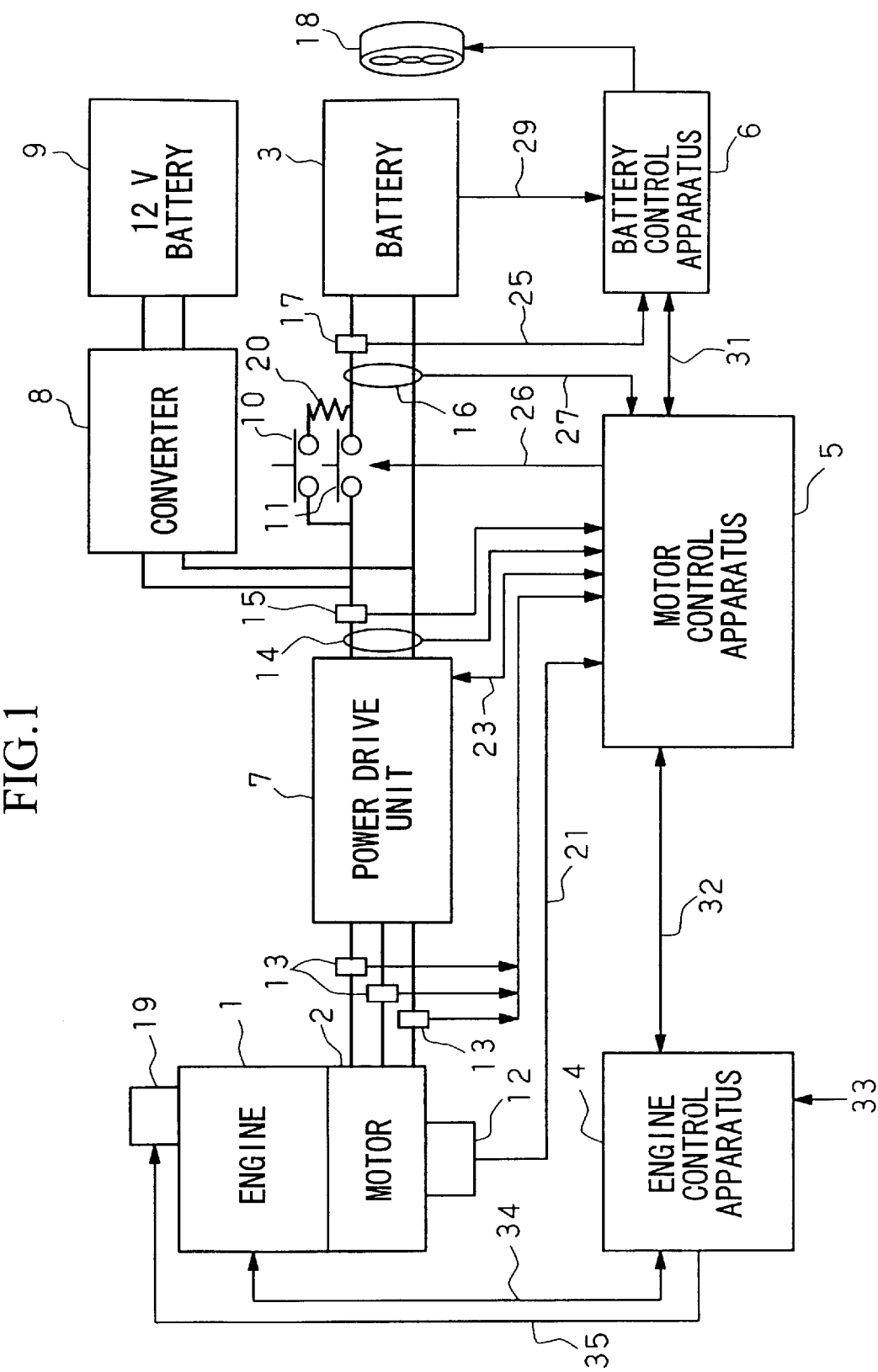
FIG. 1 is a block diagram of the configuration of a hybrid vehicle.

FIG. 1 shows a block diagram of the overall configuration of the parallel hybrid vehicle in this embodiment. A reference numeral 1 relates to an engine driven by combustion energy of fuel; 2 relates to a motor driven by electrical energy and used in parallel with the engine. The driving forces generated by the engine 1 and the motor 2 are transmitted to the drive wheels (not shown) through an automatic or a manual transmission (not shown). Also, during the deceleration stage of the hybrid vehicle, driving force is transmitted from drive wheels to the motor 2, and the motor 2 functions as a generator. In other words, the motor 2 recovers kinetic energy of the vehicle body as electrical energy, and uses the energy generated to charge the battery 3, which will be explained separately. It should be mentioned that a generator for charging the battery 3 may be provided separately from the driving motor 2.

In this case, the battery 3 is constructed to serve as a high voltage system by connecting a number of modules, each module containing a number of cells connected in series, in series. The engine 1 is started by a starter (cell motor) 19.

A reference numeral 4 relates to an engine control apparatus to monitor the operating parameters of the engine, such as engine speed and vehicle speed, at periodic intervals and determines the operational mode, such as motor regeneration, assistance, deceleration based on the monitored results. At the same time, the engine control apparatus 4 determines the amount of assistance/regeneration to suit the mode selected, and outputs information related to mode and assistance/regeneration to the motor control apparatus 5. Upon receiving such information from the engine control apparatus 4, the motor control apparatus 5 controls the power drive unit 7 and others so as to operate the motor 2 according to the instructions provided. A battery control apparatus 6 computes a state-of-charge (SOC) of the battery 3. The battery control apparatus 6 also controls a fan 18, disposed near the battery 3, used for maintaining the battery temperature below a specific temperature to protect the battery 3.

Here, the engine control apparatus 4, motor control apparatus 5 and battery control apparatus 6 are comprised of CPU (Central Processing Unit) and memory devices for executing the control functions according to pre-recorded programs.

The power drive unit (referred to as PDU hereinbelow) 7 is comprised by three parallel-connected switching devices, each switching device containing a pair of series-connected switching elements, for example. The switching elements in the interior of the PDU 7 are turned on/off by the motor control apparatus 5. The motor 2 thus obtains a high voltage direct current (DC) power, supplied from the battery 3 to PDU 7, through a three-phase line.

A reference numeral 9 relates to a 12 V battery for supplying electrical power to ancillary devices and circuits other than the motor 2, and the 12 V battery 9 is connected to battery 3 through a converter 8. The converter 8 is a downverter for reducing a voltage of the battery 3, and supplies a reduced voltage to the 12 V battery 9.

A reference numeral 10 is a pre-charge contactor and a reference numeral 11 is a main contactor, and battery 3 and PDU 7 are connected by these contactors. Pre-charge contactor 10 and main contactor 11 are turned on/off by the motor control apparatus 5.

A reference numeral 12 relates to a sensor for computing the angular position of the motor 2 and the revolution count, and a reference numeral 13 relates to a current sensor for detecting currents Iu, Iv, and Iw flowing through each line of the three-phase line. The detected results from the sensor 12 and the current sensor 13 are input into the motor control apparatus 5.

A reference numeral 14 relates to a voltage sensor for detecting the voltage Vpdu at the input section of PDU 7; 15 relates to a current sensor for detecting the current Ipdu flowing in PDU 7; 16 relates to a voltage sensor for detecting the voltage of battery 3 in the battery circuit. The results detected by the voltage sensors 14, 16 and the current sensor 15 are input into the motor control apparatus 5.

A reference numeral 17 relates to a current sensor for determining the current flowing in the circuit of the battery 3 through the contactors, and the detected results are input into the battery control apparatus 6.

As described above, the sensors 14–16 determine voltage and current values in the circuit of battery 3 through the contactors 10, 11, and voltage and current values in the circuit of PDU 7 through these contactors. Here, the current value detected by the current sensor 15 is a value excluding the current flowing in the converter 8.

Next, the operation of the hybrid vehicle having the structure described above will be explained briefly in the following.

First, the battery control apparatus 6 computes the remaining battery charge based on the measured values of the input/output current 25 and voltage 29 among others in the battery circuit, and the computed value is output to the motor control apparatus 5. The motor control apparatus 5 forwards the received data on the remaining battery charge to the engine control apparatus 4.

The engine control apparatus 4 determines necessary amount of electrical power to suit the existing mode (assistance, regeneration, start, deceleration and the like) of the motor 2 based on the remaining battery charge, engine speed, degree of throttle opening, engine torque and real torque of the motor among others, and outputs the mode and the power demand to the motor control apparatus 5.

During the assistance and deceleration stages of operation of the vehicle, upon receiving the mode and demanded power from the engine control apparatus 4, the motor control apparatus 5 performs feedback control so that the electrical power in the circuit of PDU 7 (the circuit containing voltage sensor 14 and current sensor 15 in FIG. 1) meets the power demand requested by the engine control apparatus 5, and computes a torque value. During the cruising stage, on the other hand, the motor control apparatus 5 performs feedback control so that the electrical power in the battery circuit (the circuit containing voltage sensor 16 and current sensor 17 in FIG. 1) meets the power demand and computes a torque value. When a torque value is thus computed, the motor control apparatus 5 controls PDU 7 according to the computed torque value. And, during the start stage, the motor control apparatus 5 controls the engine start process by the motor 2 by controlling the PDU 7.

Next, when the motor control apparatus 5 receives a real torque value from the PDU 7, the real torque value is forwarded to the engine control apparatus 4.

The engine control apparatus 4, motor control apparatus 5, and battery control apparatus 6 perform the processes described above periodically at certain intervals, thereby operating the hybrid vehicle through control of the engine 1, motor 2 and battery 3.

Next, the procedure for processing short circuiting (referred to as shorting hereinbelow) developed inside the PDU 7 will be explained.

Figure 2:
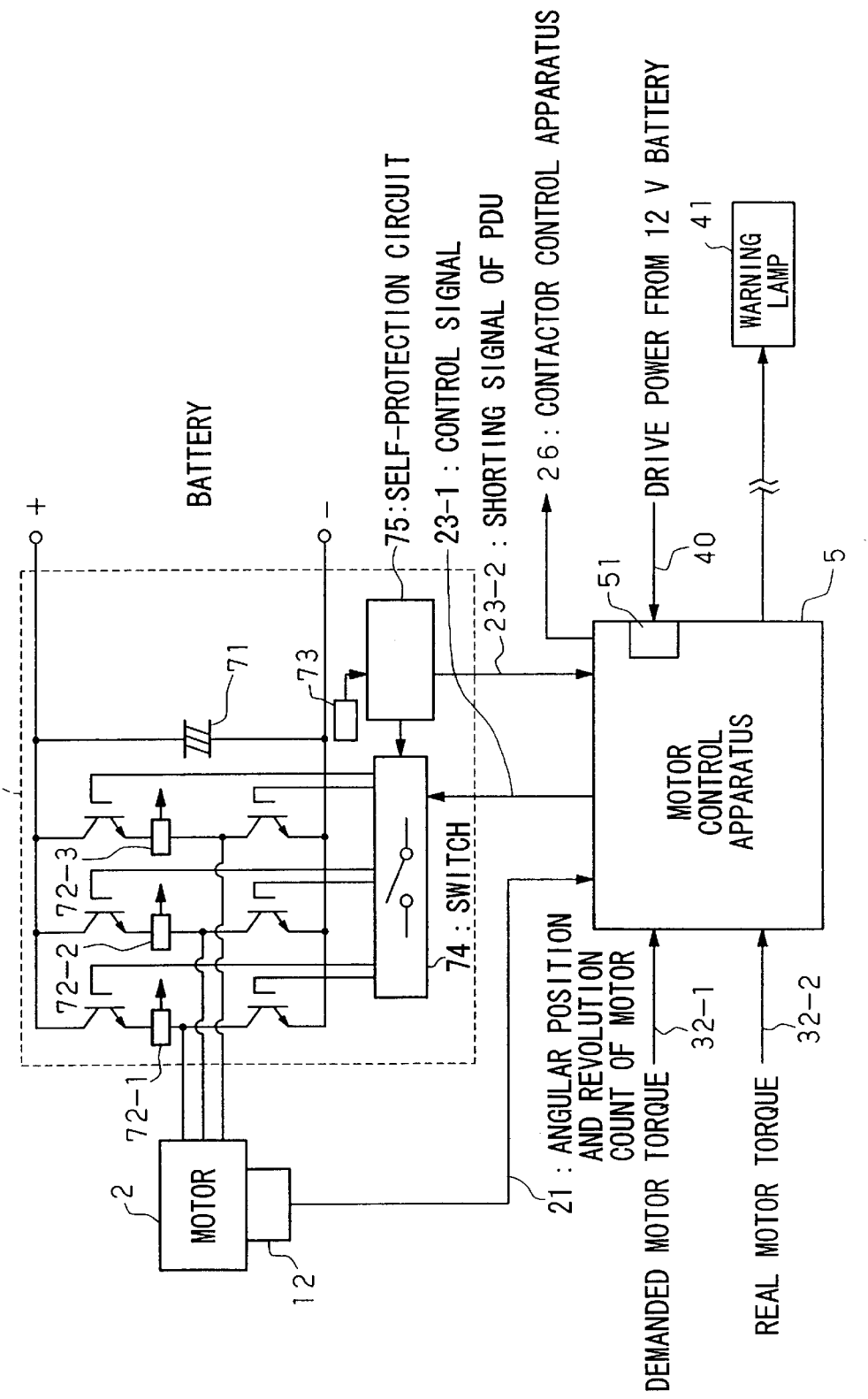
FIG. 2 is a block diagram of the power drive unit and the motor control apparatus to show details of input/output signals.

First, the structure of PDU 7 will be explained. FIG. 2 shows the structure of PDU 7 and further details of input/output signal exchanged between the PDU 7 and the motor control apparatus 5. In FIG. 2, the signals that are the same as those in FIG. 1 are referred to by the same reference numerals. Also, those signals shown in FIG. 1 (signal X in this case) are shown with further details by adding a hyphen followed by a particular numeral, such as X-1, X-2, for example.

As can be seen in FIG. 2, PDU 7 has six pieces of switching element for switching the current flowing in the three-phase line. The switching elements used here are high current capacity type elements, and in this case, it is an insulated gate bipolar transistor (IGBT). Also, the PDU 7 is provides with a high capacity condenser 71 for smoothing the variation in the magnitude of current flowing from the battery 3; current sensors 72-1, 72-2, 72-3 for detecting the current flowing in the switching devices; a temperature sensor 73 for determining the switching element temperature; and a switch 74 for supplying or blocking the control signal 23-1 input by the motor control apparatus 5 to the switching elements.

As shown in FIG. 2, the current sensors 72-1, 72-2, 72-3 are disposed between the emitter of one switching element and the collector of adjacent switching element of the respective three switching devices, and the output signals from the sensors are input into a self-protection circuit 75, which will be explained separately later. The temperature sensor 73 is disposed close to each switching element so as to measure the temperature of respective switching elements. In FIG. 2, however, to simplify the diagram, only one temperature sensor 73 is shown in a location away from the switching element. The switch 74 is normally "on" so as to supply the control signal 23-1 to the switching element. The control signal 23-1 is input into PDU 7 through a number of lines that correspond to the number of switching elements provided, however, in FIG. 2, only one control signal line 23-1 is shown for simplicity.

Further, the PDU 7 is provided with a self-protection circuit 75 that, upon detecting a short, stops the current control action for a short time (a specified interval). That is, if a short is developed inside the PDU 7, a high current would flow in one of the three switching devices disposed in parallel to each other. If a high current flows through a switching device, as a result of a short somewhere in PDU 7, that switching device is heated more than normal, resulting in temperature rise of the relevant switching device.

In such a case, the self-protection circuit 75 determines whether a short has developed according to one or the other of conditions that any of the current detected by the current sensors 72-1, 72-2, 72-3 is higher than specified or that any temperature detected by the temperature sensor 73 disposed near the switching devices is higher than specified. When one of the conditions is met, the self-protection circuit 75 outputs a control signal to the switch 74 to turn off the switch 74 for a short interval. By so doing, the gate signal to the switching devices is not applied, and all the switching devices are placed in the "off" state.

Also, the self-protection circuit 75 outputs a signal 23-2 in response to the on/off control signal input into the switch 74. By this signal 23-2, the self-protection circuit 75 reports to the motor control apparatus 5 that it is in the self-protection state due to shorting. In the following explanation, the self-protection state, in which the switch 74 is turned "off", is referred to as the "shorting state" and the signal 23-2 is termed the "shorting signal".

Figure 3:
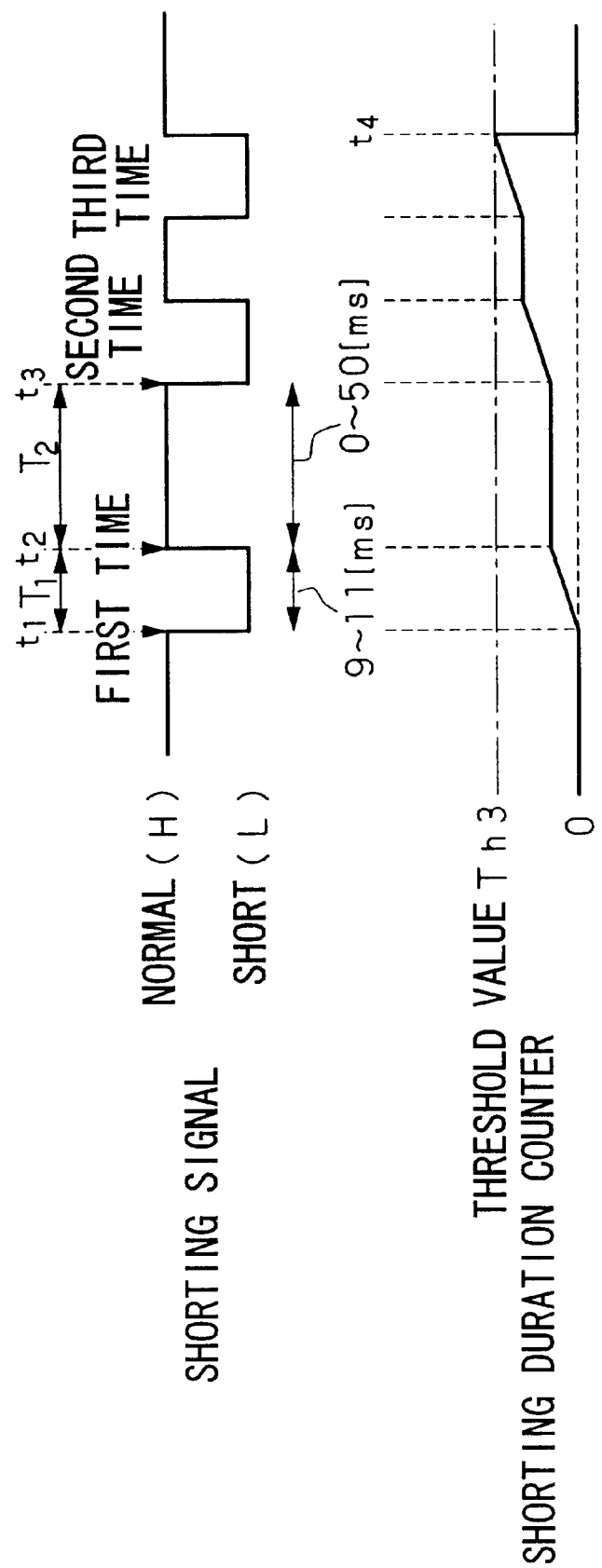
FIG. 3 is a timing chart to show the relationship between the shorting signals and shorting duration counter to obtain cumulative shorting intervals.

The shorting signal shown in FIG. 3 is an example of the shorting signal 23-2 output by the self-protection circuit 75. In FIG. 3, the self-protection circuit 75 detects a short at time t1, and turns switch 74 to "off", and also turns the shorting signal 23-2 to "low" to indicate that a short has developed. Next, the self-protection circuit 75, at time t2, corresponding to an interval T1 (9–11 ms, for example) from time t1, turns the switch 74 to "on" and also turns the shorting signal 23-2 to "high" to indicate that self-protection is off.

If the short detected by the self-protection circuit 75 was caused by signal error in current sensors 72-1, 72-2, 72-3 and temperature sensor 73, shorting state would not be detected again in the short time so that the shorting signal 23-2 would continue to indicate normal operation. In contrast, if shorting has actually occurred inside the PDU 7, the self-protection circuit 75 would detect another shorting within a certain short interval T2. The interval T2 may vary within 0–50 ms depending on the sensitivity of the current sensors 72-1, 72-2, 72-3 and the temperature sensor 73 and the revolution speed of the motor 2. If the self-protection circuit 75 detects another short at time t3, the switch 74 is turned off and the shorting signal 23-2 is turned to "low" indicating the shorting state. If an actual short has developed inside the PDU 7, the self-protection circuit 75 repeats the process described above so that the shorting signal 23-2 is repeatedly turned "on" and "off", and the shorting state is repeatedly reported to the motor control apparatus 5.

Next, the following explanation relates to the control process of protecting the PDU 7 using the shorting signal 23-2 output by the self-protection circuit 75 in accordance with the shorting check and results obtained by the motor control apparatus 5.

First, the process of shorting determination by the motor control apparatus 5 will be explained.

The motor control apparatus 5 determines that shorting has developed based on the following conditions:
condition 1—cumulative interval in shorting state continues for no less than a specified duration T3; and
condition 2—after the cumulative interval reaches the specified duration T3, outputting the control signal 23-1 to PDU 7 is temporarily stopped, and after a specified duration T4 has elapsed, the shorting signal 23-2 is checked again to determine whether condition 1 is met.

When conditions 1 and 2 are satisfied, it is then concluded that shorting has actually occurred.

Next, the process of shorting determination performed by the motor control apparatus 5 and the process of protecting the PDU 7 will be explained with reference to FIGS. 3 and 4.

The motor control apparatus 5 is provided with a shorting duration counter, as shown in FIG. 3, for determining the cumulative shorting intervals by adding the intervals that the shorting signal 23-2 indicates a shorting state. The motor control apparatus 5 decides that condition 1 is satisfied when the value of the shorting duration counter reaches a certain threshold value Th3 corresponding to the specified duration T3. In FIG. 3, condition 1 is satisfied at time t4. Here, the specified duration T3 is chosen by considering the number of repeated reporting of shorting state output by the self-protection circuit 75. In this embodiment, notification number is chosen to be three times so that the specified duration T3=30 ms (that is, self-protection interval T1×3).

Figure 4:
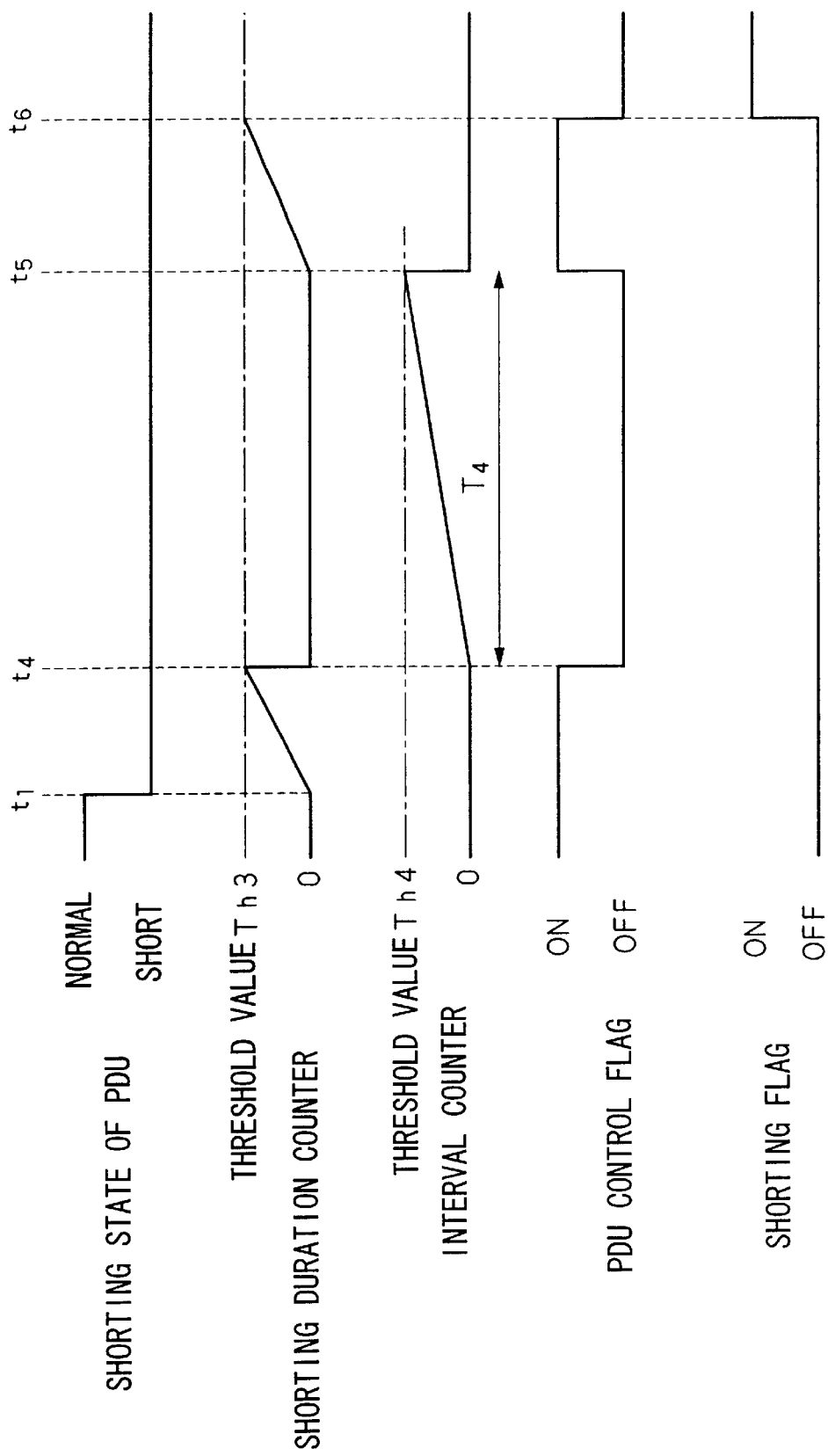
FIG. 4 is a timing chart to show the operation of the motor control apparatus in response to short circuiting in the power drive unit.

As shown by PDU shorting state in FIG. 4, a short is developed in PDU 7 at time t1, and as shown by the shorting duration counter in FIG. 4, if it is decided that condition 1 is satisfied at time t4, and as shown by the interval counter in FIG. 4, the motor control apparatus 5 measures specified duration T4 using the interval counter. The specified duration T4 is chosen by considering the interval from the time the power from battery 3 to PDU 7 is momentarily shut off to the time of power recovery (280 ms, for example), and recovery will be explained later. At time t4, as shown by the PDU flag in FIG. 4, the motor control apparatus 5 changes the PDU control flag from "ON" to "OFF" in order to interrupt the switching action of the control signal 23-1. The specified duration T4 during which the control signal 23-1 is interrupted is termed the "interval state" hereinbelow. Next, at time t5 after the specified duration T4 from time t4, the motor control apparatus 5 changes the PDU flag from "OFF" to "ON" to re-start the control action by the control signal 23-1, and, as shown by the shorting duration counter in FIG. 3, the motor control apparatus 5 repeats measurement of cumulative interval in shorting state. Then, if the cumulative interval in the shorting state continue after time t5 until the specified duration T3 to time t6, the motor control apparatus 5 decides that condition 2 is satisfied, and, as shown by the shorting flag in FIG. 4, changes the shorting flag to "ON" to indicate that shorting state is confirmed. And, the PDU flag is turned to "OFF" so that no more control signal 23-1 will be output.

The above description outlines the process of determining the shorting state in PDU 7, and the control action of the motor control apparatus 5 in responding to the shorting state.

Figure 5:
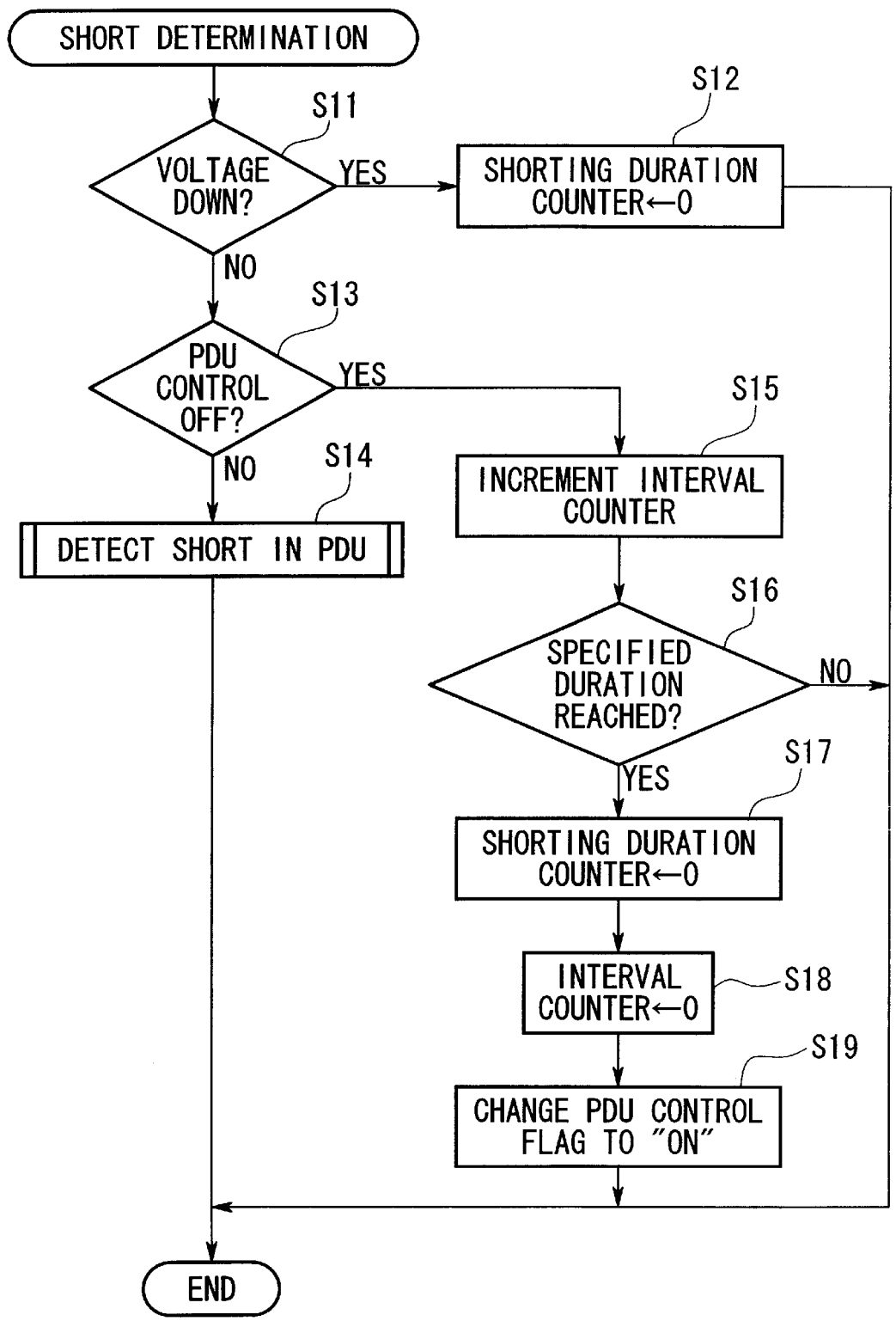
FIG. 5 is a flow chart to show the process of determining short circuiting in the motor control apparatus.
Figure 6:
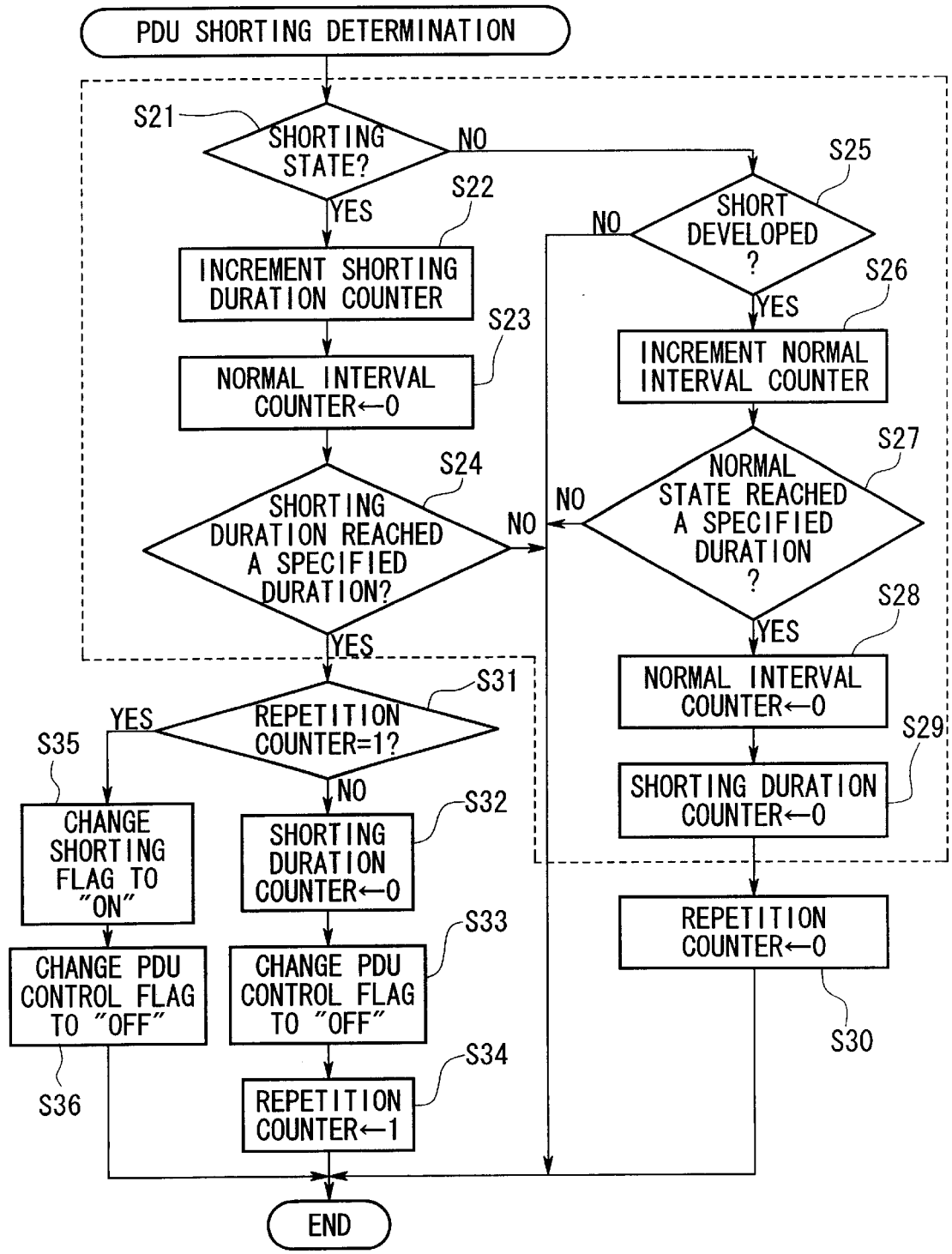
FIG. 6 is a flow chart to show the process of detecting short circuiting in the motor control apparatus.

Next, the detailed process of shorting determination by the motor control apparatus 5 will be presented with reference to the flowcharts. FIG. 5 shows a flowchart of the shorting determination process in the motor control apparatus 5, and FIG. 6 shows the flowchart of the short detection process carried out within the shorting determination process. The steps S21–S29 (boxed by dotted line) in FIG. 6 relates to the process of judging whether the existing state meets condition 1, and steps S13–S19 in FIG. 5 and steps S30–S36 in FIG. 6 relate to the process of judging whether the exiting state meets condition 2.

The process flow shown in FIG. 5 is repeated at periodic intervals from the time the engine 1 is started until the ignition switch is turned off. Also, in the processes shown in FIGS. 5, 6, various flags and counters are used by the motor control apparatus 5. These flags and counters are initialized by the initializing process performed by the motor control apparatus 5 when the ignition switch is turned on.

The motor control apparatus 5 determines whether the voltage of the 12 V battery 9 is in the voltage-down state (step S11). This is judged with reference to the voltage-down flag set by the process performed by the motor control apparatus 5, which will be explained separately.

If the 12 V battery 9 is in the voltage-down state (YES, in step S11), the motor control apparatus 5 initializes the shorting duration counter explained in FIG. 3 and ends the shorting determination process (step S12). This procedure is adopted because the 12 V battery 9 supplies power to the devices for short detection, such as the self-protection circuit 75, current sensors 72-1, 72-2, 72-3, temperature sensor 73, the motor control apparatus 5 and others. Therefore, when the voltage of the 12 V battery 9 drops such that the voltage is close to the minimum value necessary for operating these circuits and the sensors, there is a danger of malfunctioning in the circuits and sensors. In other words, even though there is no shorting in the PDU 7, there is a danger of misjudging that a short has developed. To avoid such misjudging caused by erroneous detection, the motor control apparatus 5 performs steps S11 and S12 so that the shorting signal 23-2 from the self-protection circuit 75 will not be detected.

On the other hand, if the voltage of the 12 V battery 9 is not in the voltage-down state (NO, in step S11), the motor control apparatus 5 determines whether the control signal 23-1 is output to PDU 7 (step S13). In this step, the motor control apparatus 5 determines whether condition 1 has been satisfied once and whether the motor control apparatus 5 is in the interval state (refer to FIG. 4, between times t4–t5). Here, whether the motor control apparatus 5 is in the interval state or not is determined by referencing the PDU flag and the shorting flag explained in FIG. 4.

If the motor control apparatus 5 is in the interval state (YES, in step S13), the motor control apparatus 5 increments the interval counter explained in FIG. 4 (step S15). Then, it is determined whether the specified duration T4 shown in FIG. 4 has elapsed by comparing the value of the interval counter and the threshold value Th4 (step S16). Here, because the process of shorting determination shown in FIG. 5 is repeated at regular intervals, it is possible to determine the threshold value Th4 from the relation of the specified duration T4 and the processing cycle. So, if the interval state has not reached the specified duration T4 (NO, in step S16), the motor control apparatus 5 ends the shorting determination process.

In contrast, if the interval state has reached the specified duration T4 (YES, in step S16), the motor control apparatus 5 ends the interval state, then, initializes the shorting duration counter and the interval counter in order to re-check condition 1 (steps S17, S18), and after changing the PDU control flag to "ON" in order to re-start outputting the control signal 23-1 (step S19), ends the shorting determination process.

The steps S13–S19 described above relate to the timing operation of the motor control apparatus 5 to the stage of reaching the specified duration T4.

On the other hand, if the motor control apparatus 5 is not in the interval state (NO, in step S13), the motor control apparatus 5 detects the shorting signal 23-2 to perform the short detection process for PDU 7 (step S14). The process in step S14 will be explained in the following with reference to FIG. 6.

The motor control apparatus 5 determines whether the self-protection function is operative by checking the on/off state of the shorting signal 23-2 (step S21).

If the shorting signal 23-2 shows a shorting state (YES, in step S21), shorting duration counter is incremented to accumulate the shorting intervals (step S22), and the normal state counter is initialized (step S23). Here, the normal state counter is a counter to obtain the normal state duration according to the shorting signal 23-2. Then, the motor control apparatus 5 compares the value of the shorting duration counter and the threshold value Th3 to determine whether the specified duration T3 has been reached (step S24). Here, the threshold value Th3 is determined in the same manner as the threshold value Th4 used in the interval determination from the relation of the specified duration T3 to the processing cycle for shorting determination. If the cumulative shorting intervals have not reached the specified duration T3 (NO, in step S24), the motor control apparatus 5 ends the short detection process for PDU 7.

On the other hand, if the shorting signal 23-2 shows the normal state (NO, in step S21), the motor control apparatus 5 determines whether there has been a recent shorting state (step S25). To this end, the motor control apparatus 5 checks the shorting duration counter, and if the shorting duration counter shows a zero, it is decided that there has been no recent shorting state, and if the shorting duration counter shows a value equal to or higher than 1, it is decided that the shorting state has recently been detected. If there has not been any shorting state recently (NO, in step S25), there is not short in PDU 7 so that the motor control apparatus 5 ends the short detection process for PDU 7.

In contrast, if there has been a recent shorting state (YES, in step S25), the normal state counter is incremented to obtain the normal state duration (step S26). Then, motor control apparatus 5 determines whether the normal state duration has reached the specified duration T5 by comparing the value of the normal state counter and the threshold value Th5 (step S27). The specified duration T5, indicating an actual short state, is selected to be larger than the maximum value of the interval T2 (refer to shorting signal in FIG. 3), which is the interval for re-detecting a short by the self-protection circuit 75. The threshold value Th5 is selected in the same manner to the threshold values Th3, Th4. If the normal state duration has not reached the specified duration T5 (NO, in step S27), there is a possibility that a short has actually developed in the PDU 7, so that the process is ended without initializing the counters.

On the other hand, if the normal state duration has reached the specified duration T5 (YES, in step S27), it indicates a high probability of erroneous detection for the recent short state detected by the self-protection circuit 75. Therefore, the motor control apparatus 5 initializes the normal state counter and the shorting duration counter, in preparation for a new short detection process to be undertaken (steps S28, S29). Next, the motor control apparatus 5 ends the short detection process for the PDU 7, after initializing the repetition counter which represents the number of steps to meet condition 1 (step S30).

The steps S25–S30 relate to the erroneous detection process of the motor control apparatus 5 to determine whether a shorting state report generated by the self-protection circuit 75 is due to an erroneous action of the self-protection circuit 75.

Next, if it is determined, in step S24, that the cumulative shorting intervals has reached the specified duration T3, the motor control apparatus 5 determines whether the repetition counter is showing "1" to indicate that condition 1 has been satisfied once (step S31). If this value is not "1" (NO, in step S31), the existing state corresponds to the state at time t4 shown in either FIG. 3 or 4 that condition 1 is satisfied. Then, in order to move to the interval state, the motor control apparatus 5 initializes the shorting duration counter and turns the PDU control flag to "OFF" to interrupt outputting the control signal 23-1 (steps S32, S33). Further, the motor control apparatus 5 sets "1" in the repetition counter to show that condition 1 has been satisfied once (step S34), and ends the short detection process for PDU.

If condition 1 has been satisfied once (YES, in step S31), such a state corresponds to the state at time t6 shown in FIG. 4. Therefore, the motor control apparatus 5 determines that a short is actually developed in the PDU 7, and turns the shorting flag shown in FIG. 4 to "ON" (step S35). Further, the motor control apparatus 5 sets the PDU control flag to "OFF" to stop outputting the control signal 23-1 (step S36), and ends the short detection process for PDU.

The above steps relate to the short detection process performed by the motor control apparatus 5.

Next, the process of checking the voltage of the 12 V battery 9 including the setting process of the voltage-down flag checked in step S11 shown in FIG. 5 will be explained.

The motor control apparatus 5 is provided with a voltage sensor 51 for detecting the voltage of the drive power 40 supplied by the 12 V battery 9 as shown in FIG. 2. The motor control apparatus 5 refers to the voltage value output by the voltage sensor 51, and performs a two-stage voltage checking process as follows:

stage-1 checking relates to checking of the "voltage-down" state of the 12 V battery 9 caused by such factors as starting of engine 1 using the starter 19 and insufficient charging due to lack of regeneration by motor 2 for some time; and stage-2 checking relates to checking of "voltage-low" state of the 12 V battery 9 caused by such problems as faulty drive power supply system.

First, the outline of the voltage checking process performed by the motor control apparatus 5 will be explained using specific example shown in FIG. 7.

Here, the motor control apparatus 5 stores values of the threshold voltage V1, and values of threshold intervals A1, A2 related to determining the voltage-down or voltage-low state of the 12 V battery 9. In this case, V1 is referred to as the voltage-down threshold, A1 as the voltage-down determination interval and A2 as the voltage-low determination interval. The voltage-down determination interval A1 is selected by considering the repetition cycles for the various processes, and is set to 20 ms, for example. The voltage-low determination interval A2 is selected by considering the voltage-down determination interval A1 and corresponding coefficients, and set to 100 ms, for example.

The motor control apparatus 5 stores values of threshold voltage Vh beforehand for determining voltage-up or voltage-recovery and threshold intervals B1, B2. Here, "voltage-up" refers to a state of the 12 V battery 9 that it is no longer in the voltage-down state, and "voltage-recovery" refers to a state that it is no longer in the voltage-low state. Vh is referred to as the voltage-up threshold, B1 as the voltage-up determination interval and B2 as the voltage-recovery determination interval.

Figure 7:
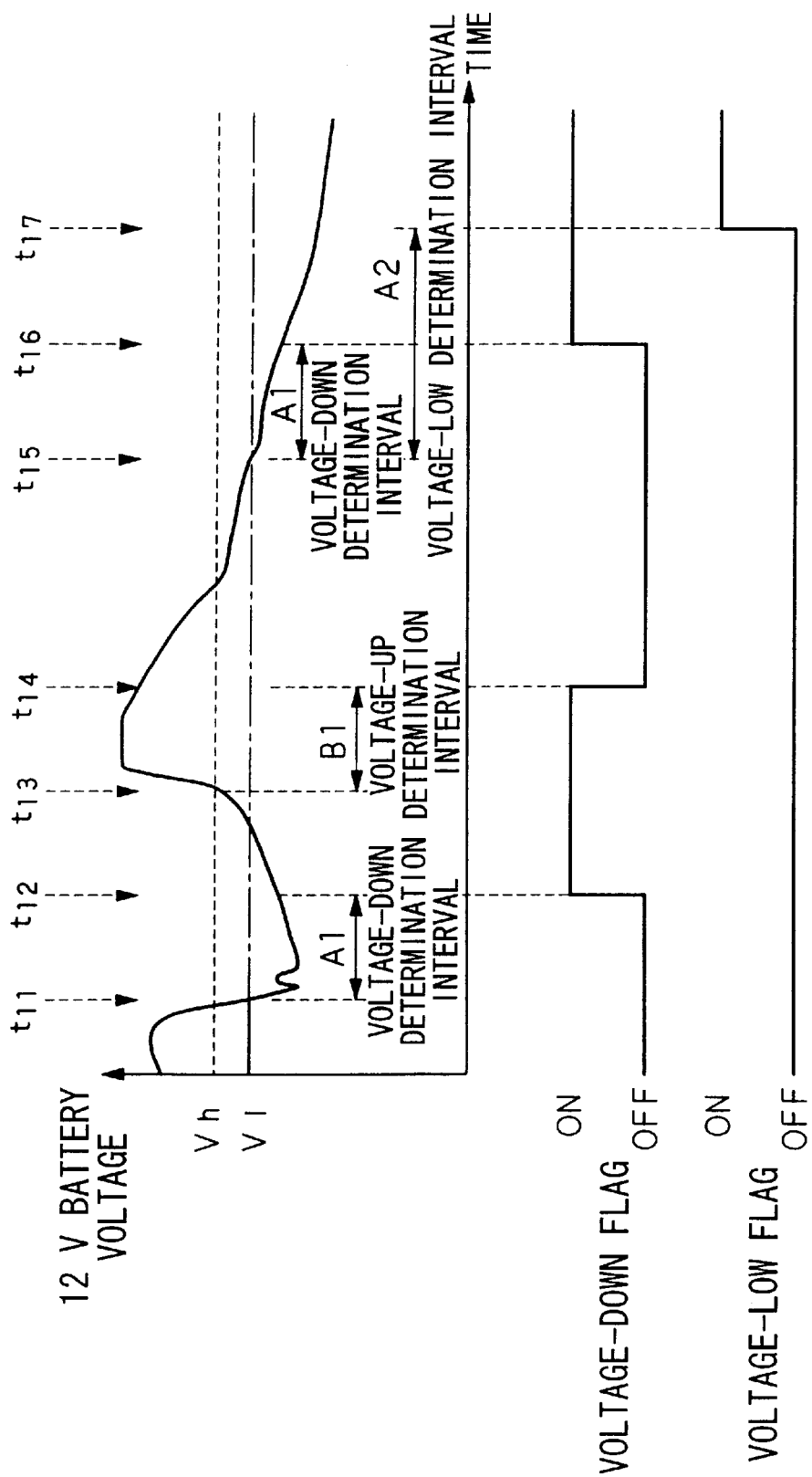
FIG. 7 is a time-series graph of detected voltage for determining the voltage-down/voltage-low state in the 12 V battery.

Referring to FIG. 7, if the voltage V of the 12 V battery 9 falls to the voltage-down threshold V1 or below (time t11), and if this state continues until the voltage-down determination interval A1 (time t2), the "voltage-down" condition is satisfied so that the motor control apparatus 5 changes the voltage-down flag from "OFF" to "ON".

If the voltage of the 12 V battery 9 rises the voltage-up threshold Vh (time t13) or above and if this state continues to voltage-up determination interval B1 (time t14), the "voltage-up" condition is satisfied so that the motor control apparatus 5 changes the voltage-down flag from "ON" to "OFF".

If the voltage of the 12 V battery 9 falls the voltage-down threshold V1 or below (time t15) and if this state continues to voltage-down determination interval A1 (time t16) and if it further continues beyond the voltage-low determination interval A2 (time t17), the "voltage-low" condition is satisfied so that the motor control apparatus 5 changes the voltage-low flag from "OFF" to "ON".

The above steps relate to the process of checking the voltage of the 12 V battery 9.

Figure 8:
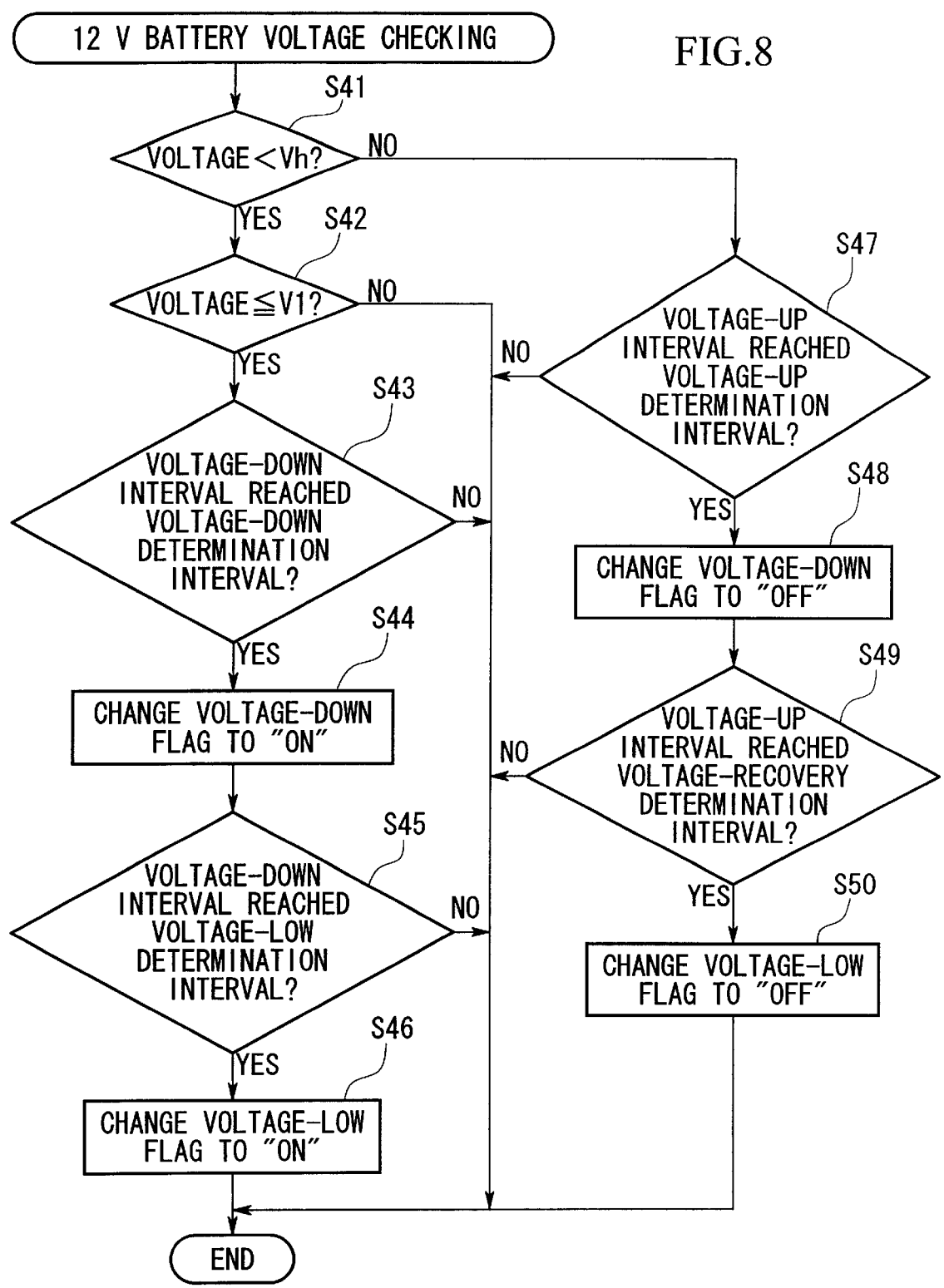
FIG. 8 is a flow chart to show the process in the motor control apparatus for determining voltage-down state and voltage-low state in the 12 V battery.

Next, the details of voltage checking process of the 12 V battery 9 by the motor control apparatus 5 will be explained in the following with reference to the flowchart shown in FIG. 8.

The process shown in this flowchart is repeatedly performed during an interval from the engine start time to the ignition switch off time by a separate process from the shorting determination process. Also, in the processes shown in FIG. 8, various flags and counters are used by the motor control apparatus 5. These flags and counters are initialized by the initializing process performed by the motor control apparatus 5 when the ignition switch is turned on.

The motor control apparatus 5 compares the voltage V detected by the voltage sensor 51 with the voltage-up threshold Vh (step S41).

If the voltage V is lower than the voltage-up threshold Vh (YES, in step S41), the motor control apparatus 5 compares the detected voltage V with the voltage-down threshold V1, and if the detected voltage V is higher than the voltage-down threshold V1 (NO, in step S41), the voltage checking process is ended.

When the detected voltage V is equal to or lower than the voltage-down threshold V1 (YES, in step S42), the motor control apparatus 5 starts timing the continuing state in which the detected voltage V is equal to or lower than the voltage-down threshold V1 (referred to as the "down-interval" hereinbelow). If the timing process ends before reaching the voltage-down determination interval A1 (NO, in step S43), the motor control apparatus 5 ends the voltage checking process.

When the down-interval reaches the voltage-down determination interval A1 (YES, in step S43), the motor control apparatus 5 changes the voltage-down flag to "ON" to indicate the voltage-down state (step S44).

When the voltage-down interval reaches the voltage-low determination interval A2 (YES, in step S45), the motor control apparatus 5 changes the voltage-low flag to "ON" to indicate the voltage-low state (step S46), and finishes the voltage-low interval timing process and ends the voltage checking process.

Here, the voltage checking process is ended if the timing of the down-interval is finished before reaching the voltage-low determination interval A2 (NO, in step S45) also.

The above steps S42–S46 relate to the process of determining voltage-down/low for the 12 V battery 9.

On the other hand, if the detected voltage V is equal to or higher than the voltage-up threshold Vh (NO, in step S41), the motor control apparatus 5 begins timing the continuing when the detected voltage V is equal to or higher than the voltage-up threshold Vh to monitor the interval of the voltage-up state (referred to as the voltage-up interval hereinbelow). Here, if the timing of the voltage-up interval is finished before reaching the voltage-up determination interval B1 (NO, in step S47), the motor control apparatus 5 ends the voltage checking process.

When the voltage-up interval reaches the voltage-up determination interval B1 (YES, in step S47), the motor control apparatus 5 changes the voltage-down flag to "OFF" to indicate that the 12 V battery 9 is not in the voltage-down state (step S48).

Further, when the voltage-up interval reaches the voltage-recovery determination interval B2 (YES, in step S49), the motor control apparatus 5 changes the voltage-low flag to "OFF" to indicate that the 12 V battery 9 is not in the voltage-low state (step S50). Then, the motor control apparatus 5 finishes the voltage-up interval timing process and ends the voltage checking process. If the voltage-low state is a false alarm, and in reality, there is no fault in the power supply system from the 12 V battery 9, the erroneous determination is corrected in the process of carrying out the step S50.

Here, the voltage checking process is ended also, when the timing of the voltage-up interval is finished before reaching the voltage-recovery determination interval B2 (NO, in step S49) also.

The steps S41 and the steps S47–S50 relate to the process of voltage-up/recovery determination.

The motor control apparatus 5 performs voltage checking process of the 12 V battery 9 according to the various processes described above.

Next, the process of controlling PDU 7 by the motor control apparatus 5 based on the results of shorting determination process and the voltage checking process for the 12 V battery 9 will be explained with reference to FIG. 9.

Figure 9:
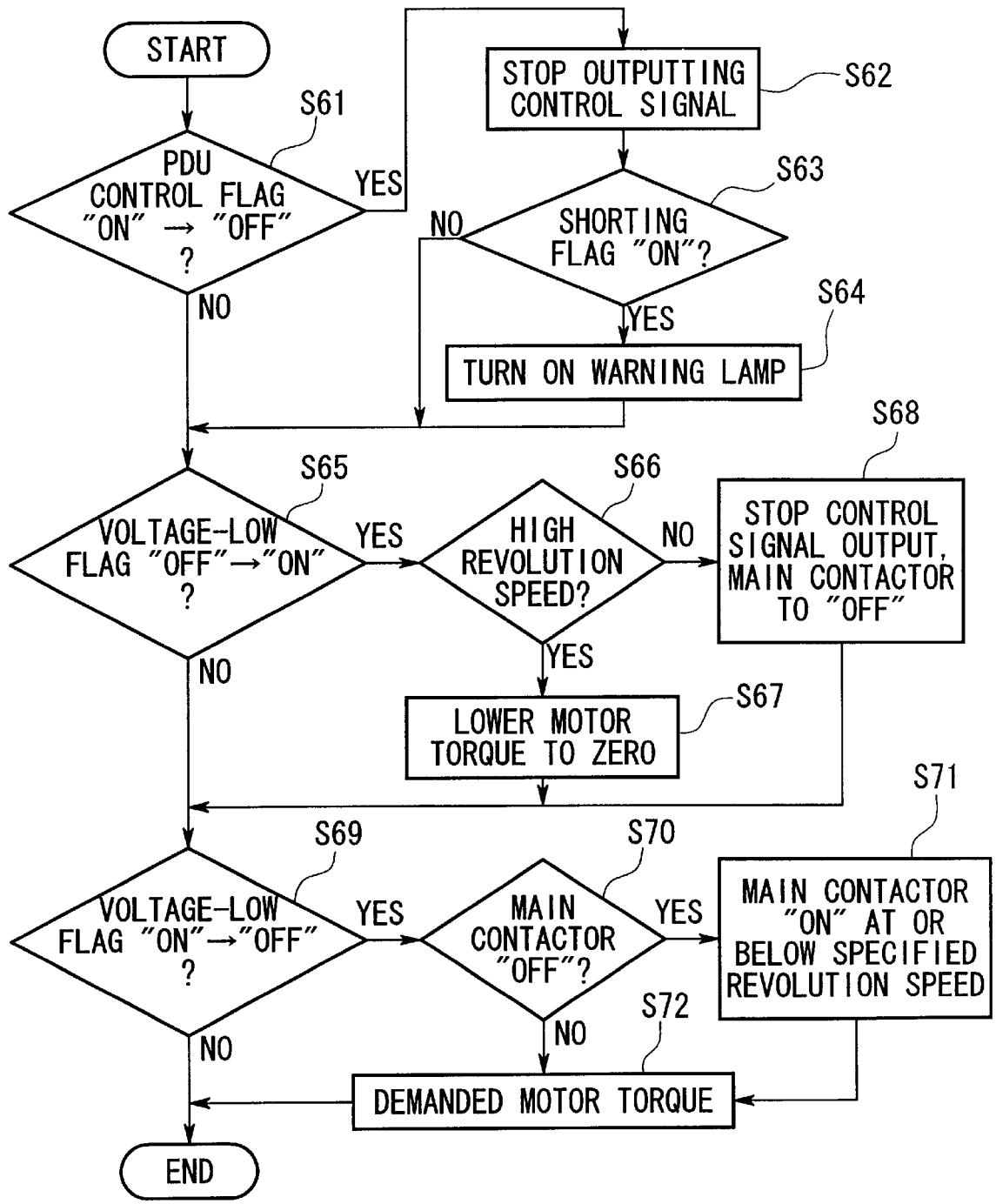
FIG. 9 is a flow chart to show the process of responding to the results of shorting determination in the motor control apparatus and the voltage check of the 12 V battery.

The process flow in the flowchart shown in FIG. 9 is repeatedly performed during an interval from the engine start time to the ignition switch off time by a specific process.

First, the motor control apparatus 5 checks the PDU control flag which is set during the shorting determination process. If the PDU control flag changes to "OFF" to indicate outputting interrupt/stop of the control signal 23-1 (YES, in step S61), the motor control apparatus 5 interrupts/stops outputting the control signal 23-1 (step S62). Further, if the shorting flag which is set during the shorting determination process is "ON" to indicate short confirmation (YES, in step S63), the motor control apparatus 5 outputs a signal to turn on the warning lamp 41 (refer to FIG. 2), installed in front of the driver's seat, to notify the driver of an abnormal condition of PDU 7 (step S64).

Then, the motor control apparatus 5 checks the voltage-low flag which is set during the voltage checking process of the 12 V battery 9. When the voltage-low flag changes to "ON" to indicate the voltage-low state (YES, in step S65), the motor control apparatus 5 determines, based on the signal 21, whether the revolution speed of the motor 2 exceeds a specific revolution count value (step S66).

If the revolution speed of the motor 2 is the high speed state exceeding the specific revolution count value (YES, in step S66), the motor control apparatus 5 leaves the main contactor 11 in the "ON" position and regardless of the demanded motor torque 32-1 from the engine control apparatus 4, outputs the control signal 23-1 so that the counter-electromotive voltage of the motor 2 becomes lower (weak electric field control) and motor torque to be zero (step S67). Also, the motor control apparatus 5 notifies the engine control apparatus 4 that real motor toque is zero, by outputting signal 32-2.

If, on the other hand, the revolution speed indicates that the motor 2 is in the low speed state (NO, in step S66), the motor control apparatus 5 stops outputting the control signal 23-1. Then, the motor control apparatus 5 outputs control signal 26 to turn the main contactor 11 to "OFF" and changes the flag to show the state of the main contactor 11 from "ON" to "OFF" (step S68). Here, the motor control apparatus 5 performs the process in step S68 even when the high revolution state changes to the low revolution state during the voltage-low state.

The steps S65–S68 enables the motor control apparatus 5 to safely end control of motor 2 during the voltage-low state which suggests a possibility of faulty power supply system before the power supply is completely exhausted in the 12 V battery 9.

When the voltage-low flag changes to "OFF" to indicate voltage-recovery (YES, in step S69), the motor control apparatus 5 determines whether the flag for the main contactor 11 is in the "OFF" state (step S70).

If the main contactor 11 is in the "OFF" state (YES, in step S70), the motor control apparatus 5 output a control signal 26 for turning "ON" the main contactor 11 after the motor revolution speed is equal to or below a specific revolution speed (for example, 2500 r.p.m.) (step S71).

When the main contactor 11 in the "ON" state (NO, in step S70) or the processing of step S71 is finished, the motor control apparatus 5 outputs the control signal 23-1 so as to meet the demanded motor torque output by the engine control apparatus 4, and sends a signal 32-2 to report the real motor torque to the engine control apparatus 4 (step S72).

If, although it had been determined that the voltage is low, there is in actual fact no fault in the 12 V battery 9 power supply system and the voltage is recovered to high, the motor control apparatus 5 can return to the normal control mode by performing the process described in steps S69–S72.

In the present embodiment, the motor control apparatus 5 controls PDU 7 based on the results of shorting determination process and the voltage checking process of the 12 V battery 9 according to the various steps described above.

The present invention is superior because, by basing the control of PDU 7 on the results of voltage checking of 12 V battery 9, the motor control apparatus 5 increases its response capability to meet the changes in the voltage output from the 12 V battery 9. Also, the drive power of the 12 V battery 9 is normally supplied to the self-protection circuit 75 as well as to current sensors 72-1, 72-2, 72-3 and temperature sensor 73, but when the voltage of the 12 V battery 9 is low, the motor control apparatus 5 does not provide control of PDU 7 so that there is no need to design the PDU 7 to operate at low voltages, thereby lowering the cost of PDU 7.

Also, in the present embodiment, the parallel-hybrid vehicle was shown in FIG. 1 as an application of combining and distributing the output of motor 2 and engine 1, but the present invention is not limited to this type of vehicle. For example, the present invention is applicable also to various types of hybrid vehicles in which the motive power is transmitted/disconnected through the clutch.

Also, although IGBT was used as the switching element for PDU 7 in the present embodiment, the switching element may be made of power-type FET (Field Effect Transistor) devices.

Also, in the present embodiment, the current sensors 72-1, 72-2, 72-3 provided in PDU 7 are connected between the emitter and the collector of two series-connected switching elements so as to detect the current flowing in the switching elements. The reason is that the purpose of the self-protection function in PDU 7 is to protect the switching element from damage caused by shorting, therefore, a method of self-protection based on the value of the current flowing through the switching elements is chosen so as to reliably prevent damage to the switching elements. However, the present invention is not limited to this design, and for example, the current sensor may be connected in series with the condenser 71 shown in FIG. 2 so as to detect the input/output current of the condenser 71. Such a design allows reduction in the number of current sensors, but also facilitates a short detection because shorting causes release of charges stored in the condenser 71 and causes disturbance in the average current in the condenser 71, and the tolerance of the current sensor with respect to current can be determined in accordance with the capacity of the condenser 71.

Also, in the present embodiment, the self-protection circuit 75 detects shorting based on the current value flowing through PDU 7 and the temperature of switching elements. However, the present invention is not limited to such a design so that PDU 7 may have either the temperature sensor 73 or the current sensors 72-1, 72-2, 72-3, and the self-protection circuit 75 may detect a short based only on either the temperature of switching elements or a current value flowing through PDU 7.

Also, in the present embodiment, the motor control apparatus 5 performs the process shown by a dotted box in the drawing to determine whether condition 1 is satisfied, i.e., to indirectly determine whether the shorting state has been detected for a given number of times according to whether the cumulative shorting interval reached the specified duration T3. When there is an actual short in PDU 7, there is a possibility of interval T2 to become zero, depending on the revolution speed of the motor, as shown by the short signal in FIG. 3. For this reason, if the method is based on detecting changes in state of "H" or "L" of the shorting signal 23-2, there are situations in which it is not possible to determine whether the shorting state has been detected for the required number of times. However, in order to simplify the detection process of the motor control apparatus 5 for the requisite number of detection, it is permissible to determine, whether the requisite number of detection has been made to satisfy condition 1, by detecting changes in "H" and "L" of the shorting signal 23-2.

Also, in the present embodiment, the motor control apparatus 5 determines whether a short has actually been developed in PDU 7 by satisfying conditions 1 and 2. This is because, by having condition 2, it is possible for the motor control apparatus 5 to prevent erroneous shorting confirmation caused by a short break of power to PDU 7. In order to simplify the detection process, however, it is permissible to confirm that a short has occurred when condition 1 is satisfied, in other words, by confirming that the number of times of shorting state output from the self-protection circuit 75 has reached a requisite number or the cumulative interval has reached a specified value.

Also, in the present embodiment, the motor control apparatus 5 determines the voltage-down state of the 12 V battery 9 when the detected voltage V is equal to or lower than the voltage-drop threshold V1 and that this state continues for no less than the specified voltage-down determination interval A1. This method is preferable because, by so doing, the motor control apparatus 5 can reliably determine the voltage-down state even when the detected voltage V is fluctuating in the vicinity of the voltage-down threshold V1, by disregarding such fluctuations. However, the present invention is not limited to such a design, and for example, in order to simplify the short detection process, it is permissible for the motor control apparatus 5 to determine that the 12 V battery 9 is in the voltage-down state when the detected voltage V falls the specific voltage-drop threshold V1 or below. Similarly, the motor control apparatus 5 may determine voltage-down, voltage-up and voltage-recovery states of the 12 V battery 9 only according to a relationship of the detected voltage V of the 12 V battery 9 to some specific threshold value.

Also, in the present embodiment, the motor control apparatus 5 uses two different values of threshold voltages, voltage-up threshold Vh and voltage-down threshold V1, as parameters for checking the voltage of the 12 V battery 9. The reason for using two threshold values is that these threshold values are chosen by considering the normal operating voltage as well as the minimum operating voltage of the circuits powered by the 12 V battery 9. However, in order to simplify the processes, one value may be used for both threshold voltages, Vh and V1.

Also, in the present embodiment, the motor control apparatus 5 is provided with a voltage sensor 51 to determine the voltage of the 12 V battery 9, however, it is not limited to this type of device. For example, the 12 V battery 9 may be provided with a voltage sensor so that the detected voltage is then sent to the motor control apparatus 5 to determine the voltage of the 12 V battery 9.

The present invention has been demonstrated above with reference to the drawings, but the specific detailed structures are not limited to those shown in the diagrams, and modifications of the basic design principle outlines in the present invention are intended to be included in the specific examples demonstrated.

What is claimed is:

1. A hybrid vehicle comprising:
    an engine;
    a motor which operates with electrical energy;
    a power drive unit having switching elements to control the flow of current to operate said motor; and
    a control apparatus for generating control signals to operate said switching elements; wherein
        said power drive unit is further provided with a self-protection circuit to interrupt the supply of said current to said switching elements temporarily for a specified interval when a temperature of at least one of said switching elements is higher than a specific temperature value or the value of current flowing through said power drive unit is greater than a specific current value, and to output a signal indicating that said power drive unit is in a self-protection state caused by a current flow interruption; and
        said control apparatus receives said signal from said self-protection circuit indicating that said power drive unit is in the self-protection state, and if a number of times said self-protection state is greater than a predetermined number or if the cumulative time in said self-protection state is greater than a predetermined time, said control apparatus prohibits said control signal from operating said switching elements.

2. A hybrid vehicle according to claim 1, wherein said control apparatus prohibits said control signals when said control apparatus sequentially detects, at a predetermined duration, a condition that either a number of times said signal is received is greater than a predetermined number or the cumulative time in said self-protection state is greater than a predetermined time.

3. A hybrid vehicle according to claim 1, wherein said vehicle is further provided with a battery to supply driving power to at least said self-protection circuit and said control apparatus; and said control apparatus stops receiving said signal sent from said self-protection circuit when a detected voltage of said battery is lower than a specified voltage value.

4. A hybrid vehicle according to claim 3, wherein said control apparatus decides that said battery is in a voltage-low state when a state, in which said detected voltage of said battery is lower than said specified voltage value, continues for a specified voltage-low determination interval, and responds by lowering an existing value of the motor torque to zero or by prohibiting said control signals depending on the operating conditions of said motor.

5. A hybrid vehicle according to claim 4, wherein said control apparatus determines that said battery that had been in a voltage-low state is now in a voltage-recovery state when a state, in which said detected voltage of said battery is higher than a specified threshold value, continues for a specified voltage-recovery determination interval, and responds by outputting a control signal to operate said motor so as to adjust an existing value of the motor torque to match a demanded value of the motor torque.

* * * * *